United States Patent [19]

Ekonen et al.

[11] 4,231,554

[45] Nov. 4, 1980

[54] CONTROL VALVE FOR VEHICLE AIR SPRINGS AND THE LIKE

[75] Inventors: Martin A. Ekonen, Livonia; James L. Blechschmidt, Plymouth, both of Mich.

[73] Assignee: Ford Motor Company, Dearborn, Mich.

[21] Appl. No.: 952,179

[22] Filed: Oct. 17, 1978

[51] Int. Cl.³ .................. B60G 11/26; F16F 3/00; F16F 5/00; F16F 13/00
[52] U.S. Cl. .................. 267/65 D; 137/625.68; 267/DIG. 1; 280/714
[58] Field of Search ........... 267/65 D, 65 R, DIG. 1, 267/1; 280/714, 711; 137/625.68

[56] References Cited

U.S. PATENT DOCUMENTS

| | | | |
|---|---|---|---|
| 732,169 | 6/1903 | Chapman | 267/1 X |
| 1,245,603 | 11/1917 | Lewis | 267/1 X |
| 1,470,863 | 10/1923 | Morse | 267/1 X |
| 2,989,983 | 6/1961 | Valentine | 267/65 D X |
| 3,214,155 | 10/1965 | Leavell | 267/1 |
| 3,300,203 | 1/1967 | Carter et al. | 267/1 X |
| 4,064,910 | 12/1977 | Weisenberger | 267/DIG. 1 X |

FOREIGN PATENT DOCUMENTS 27070 12/1956 Fed. Rep. of Germany ........ 267/65 D

Primary Examiner—Douglas C. Butler
Attorney, Agent, or Firm—Steven L. Permut; Clifford L. Sadler

[57] ABSTRACT

A control valve having a cylinder mounted to a frame of a motor vehicle and a piston rod mounted to an axle of a motor vehicle for controlling the amount of air introduced to or exhausted from an air suspension spring mounted between the axle and frame of the motor vehicle. The piston rod is connected to a piston which is slidable within a cylinder. Three ports, a port leading to an air spring, an exhaust port, and a supply port extend through the side wall of the cylinder. A piston has a passage therethrough with one outlet at the top surface of the piston and a second outlet at a side surface of the piston. The piston is movable to three positions; one position with the supply port in communication through the passage, with the air spring port, a second position which all three ports are sealed from one another, and a third position in which the air spring port is in communication with the exhaust port. As air flows to and from the air spring connected to the air spring port, the piston slides respectively down and up towards its second position to control the height of the motor vehicle.

6 Claims, 4 Drawing Figures

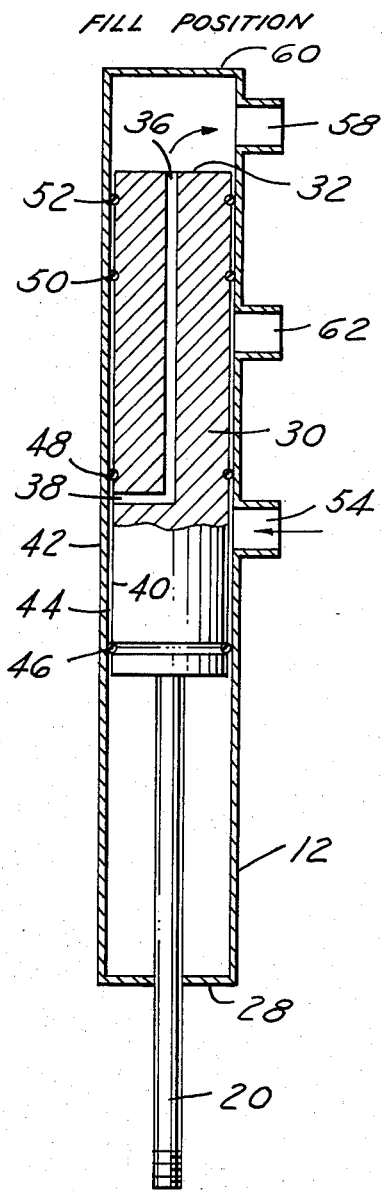
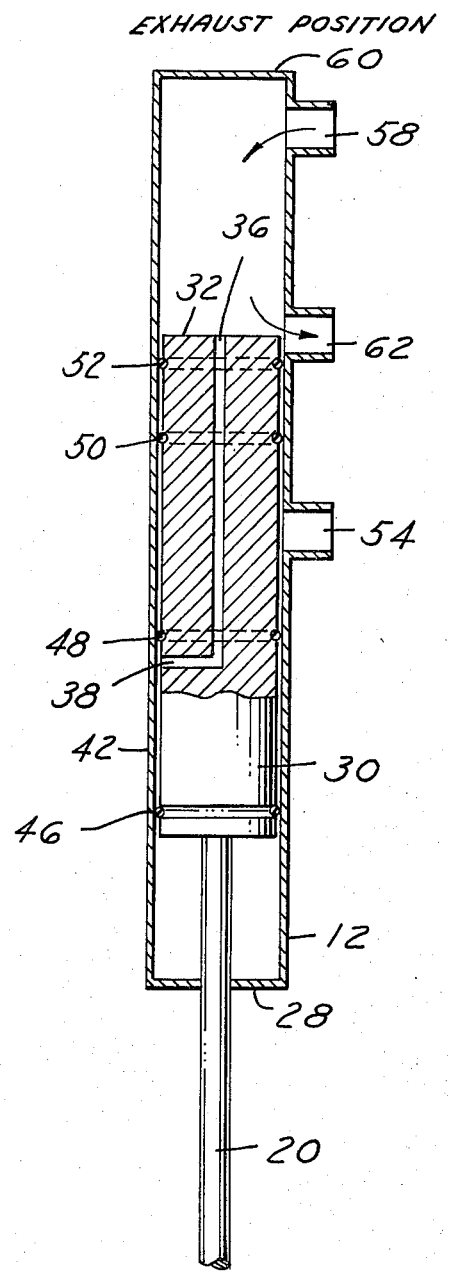

CONTROL VALVE FOR VEHICLE AIR SPRINGS AND THE LIKE

BACKGROUND OF THE INVENTION

1. Field of the Invention

This invention relates to control valves and, more particularly, to control valves which control the height of vehicles and the like.

2. Description of the Prior Art

One of the great advantages of air spring suspensions for motor vehicles is the fact that the air springs can be easily adjusted by the introduction of more air or by the exhaustion of some air from the spring to control the height of the vehicle frame and body with respect to the axle and the character of the ride of the vehicle. The adjustability of the air spring is particularly useful on vehicles like pick-up trucks where the load carried by the vehicle may vary greatly. In order to automatically control the height of the vehicle, air control valves have been operably connected to the air spring and an air compressor.

The control valve detects the level of the frame with respect to the axle. If the frame is too low, the control valve will allow the air compressor to supply air to the air spring to raise the frame. If the frame is too high the control valve will allow air within the air spring to escape. One such control valve is disclosed in U.S. Pat. No. 2,989,983 issued to Valentine on June 27, 1961. The Valentine patent discloses a control valve with a supply port entering into a first chamber. A disc is mounted at the bottom of the first chamber. Below the disc is a bore with a piston slidable mounted therein. The piston has a passage therethrough leading from the top end to the bottom end thereof. The bore also has a side passage leading to the air spring. When the frame is too high, the piston is lowered away from the disc allowing the passage to be in fluid connection with the bore. Air leaks into the passage through the piston to alleviate the excess air pressure within the air spring. When the frame is too low, the piston lifts the disc up allowing air from the air port to communicate with the passage to the air spring.

Another such control valve is disclosed in U.S. Pat. No. 4,064,910 issued to Weisenberger on Dec. 27, 1977. In the Weisenberger patent, instead of a disc, a conical valve closure member closes an end of a passage through the piston stem and also abuts the shoulders leading to the bore which houses the stem. The manner of operation is the same as that for the device described in the Valentine patent.

SUMMARY OF THE INVENTION

According to the invention, a pneumatic control valve controls the flow of compressible fluid to and from a work station. The work station, in one embodiment, is an air spring mounted between an unsprung axle and a sprung frame and body of a motor vehicle. The control valve controls the amount of air passing to and from the air spring to control the height of the frame with respect to the axle.

The control valve has a cylinder with a first, second and third port therethrough. The first port is connected to a supply of compressible fluid preferably air from a compressor. The second port is connected to the air spring and the third port is an exhaust port.

Preferably, the first, second and third ports are mounted along the side wall of the cylinder. The second port is located near the top of the cylinder and the third port is situated between the first and second ports.

A piston is slidably mounted in the cylinder. The piston has a piston rod extending therefrom which extends through one end of the cylinder. In one embodiment, the piston rod extends from the bottom of the cylinder. In this embodiment, the piston rod is connected to the axle and the cylinder is operably connected to the frame of the vehicle.

The piston is moveable to a first position within the cylinders such that the first port is in communication with the second port and the piston seals the sides of the cylinder whereby the third port is sealed from the first and second ports. The piston is moveable to a second position which seals all three ports from fluid communication with each other. The piston is also moveable to a third position such that the third port is in fluid communication with the second port and the first port is sealed from the other two ports.

The piston has a passage therethrough which fluidly connects the second port with one of the first and third ports when the piston is in one of its respective first and third positions.

In one embodiment, the passage has a first outlet at the top surface of the piston and a second outlet on the side surface of the piston. Seals are circumferentially mounted about the side surface of the piston at its top end. In addition, seals are circumferentially mounted about the side surface of the piston above and below the second outlet. The seals are in abutting relationship with the side walls of the cylinder. The side surface of the piston is spaced from the side wall of the cylinder which creates a clearance therebetween in communication with the second outlet. When the piston is in its first position, the first port is in fluid communication with the clearance and second outlet so that air can pass through the passage in the piston, exit the first outlet and enter the air spring port to elevate the frame with respect to the axle.

The air spring is operably connected to both the cylinder and pistons such that as air moves into the air spring and raises the frame and body with respect to the axle, the piston moves to its second position. Further, when the piston is in its third position and air escapes through the exhaust, the escaping air from the air spring causes the frame and body to be lowered and moves the piston to its second position.

In this fashion, the control valve maintains the frame and body at a certain height with respect to the axle. Any deviations from the predetermined height are corrected by the introduction or exhaustion of air to or from the air spring.

BRIEF DESCRIPTION OF THE DRAWINGS

Reference now will be made to the following drawings in which:

FIG. 3 is an enlarged elevational and partially segmented view of the valve shown in its first or fill position.

FIG. 4 is an enlarged elevational and partially segmented view of the control valve in its third or exhaust position.

DESCRIPTION OF THE PREFERRED EMBODIMENT

Figure 1:
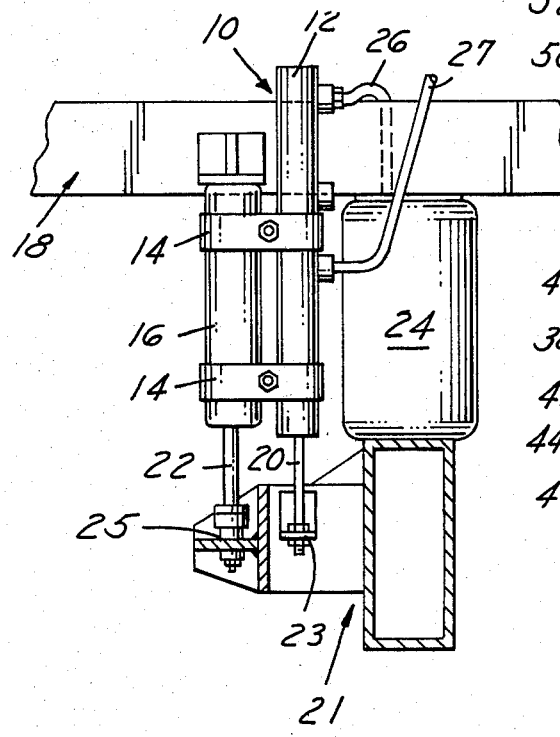
FIG. 1 is a side elevational view of one embodiment of the invention in its preferred setting.

Referring particularly to FIG. 1, a control valve 10 has a cylinder 12 rigidly mounted by clamps 14 to a shock absorber cylinder 16 which is connected in a conventional fashion to a frame 18 of a motor vehicle. A control valve 10 has a downwardly extending piston rod 20 bolted to an axle 21 at flange 23. Piston rod 22, downwardly extending from shock absorber 16, is also bolted to axle 21 at flange 25. An air spring 24 is mounted between the frame 18 and axle 21. The air spring is supplied with air from a compressor (not shown) which is connected to one end of hose 27. Hose 27 has its other end connected to control valve 10. Control valve 10 is connected to an air spring 24 by hose 26.

Figure 2:
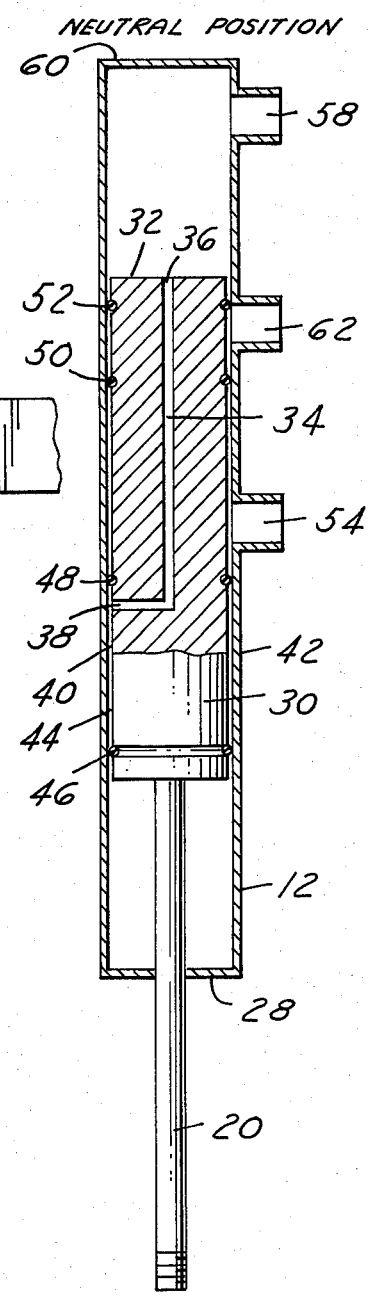
FIG. 2 is an enlarged elevational and partially segmented view of the control valve shown in FIG. 1 in its second or neutral position.

The interior of control valve 10 is clearly shown in FIGS. 2 through 4. A piston rod 20 extends through the bottom 28 of cylinder 12. The piston rod 20 is connected to a piston 30. The piston 30 has a top surface 32. A passage 34 extends through the piston with one outlet 36 at the top surface 32 and the second outlet 38 on the side surface 40 of piston 30. The piston side surface 40 is spaced from the side wall 42 of cylinder 12 to form a clearance 44 therebetween. "O"-ring seals 46 and 48 are located above and below the second outlet 38. "0"-ring seals 50 and 52 are attached to the piston near the top surface 32.

The cylinder side wall 42 has a first port 54 operably connected to hose 27 as shown in FIG. 1 leading to the compressor (not shown). A second port 58 is connected to hose 26 which leads to the air spring 24. The second port 58 is located near the top end 60 of cylinder 12. The third port 62 is located on the side wall 42 between the first port 54 and the second port 58. The exhaust port 62 is open to the atmosphere.

OPERATION OF THE CONTROL VALVE

Referring to FIG. 3, when the piston is in its first or fill position, due to extra weight carried by the motor vehicle, the supply port 54 is located between seals 46 and 48. The exhaust port 62 is located between seals 48 and 50. The second port 58 is located above the top surface 32 of piston 30. Air from a compressor passes through port 54 into the clearance 44 between the seals 46 and 48 and then into outlet 38 through passage 34 and out through outlet 36 into the air spring port 58. As air passes through port 58 into the air spring 24, the air spring lifts frame 18 with respect to the axle 21 and piston 30 is moved downwardly with respect to the cylinder 12 toward a position shown in FIG. 2.

When the piston 30 is in the second or neutral position as shown in FIG. 2, the supply port is located between seals 48 and 50 on piston 30. Exhaust port 62 is located between seals 50 and 52. The air spring port 58 is still above the top surface 32. The outlet 38 is no longer aligned with the supply port 54 and both the supply port 54 and exhaust port 62 are sealed from the air spring port 58 and from each other.

When extra weight, which originally necessitates additional air introduced into the air spring 24, is removed from the vehicle, the pressure within air spring 24 forces the frame 18 to move upwardly away from the axle 21. When this upward movement of the frame occurs, the piston 30 moves further downward with respect to the cylinder 12 into a third or exhaust position as shown in FIG. 4. In the exhaust position, the supply port 54 is situated between seals 48 and 50. The supply port is effectively sealed from the outlet 38 and also sealed from both the air spring port 58 and exhaust port 62. The exhaust port is now located above seal 52 and above the top surface 32 of the piston 30 and is in fluid communication with the air spring port 58. Pressurized air from the air spring will flow through hose 26 and into the cylinder 12 and out through the exhaust port 62. As the air flows through exhaust port 62, the frame 18 will then move downwardly toward axle 21 and piston 30 will move upward with respect to cylinder 12 back to its second position as shown in FIG. 3.

In this fashion, a control valve controls the height of a frame above the axle to maintain a limited desired distance therebetween. The control valve automatically adjusts for changes in weight on a motor vehicle which would change the amount of air needed in air spring 24 to maintain the desired height. The control valve automatically shuts off the flow of air to and from the air spring when the desired level is reached. The piston and cylinder provide for a simple control valve with a minimum number of parts which can be easily manufactured.

Variations and modifications are possible within the scope of the foregoing disclosure and drawings without departing from the spirit of the invention which is defined by the appended claims.

We claim:

1. A pneumatic control valve for a vehicle suspension system for controlling the flow of compressible fluids to and from an air suspension spring comprising;
   a cylinder with a first, second and third ports therethrough spaced intervally along the cylinder wherein said ports enter the sidewall of said cylinder;
   said first port operably connected to a supply of compressible fluid;
   said second port operably connected to an air suspension spring;
   said third port being in fluid communication with the exteriof of said cylinder;
   a piston slidably mounted in the cylinder in abutting relationship with the interior of the cylinder;
   a piston rod rigidly connected to said piston and extending through the bottom end of said cylinder;
   said second port is at the top portion of the cylinder with the first and third ports positioned below said second port;
   said piston having a passage therethrough;
   said piston moveable to a first position such that said first port is in communication with said second port such that compressible fluid passes from said first port through said second port to said air spring and said piston seals the side of said cylinder sealing the third port from the said first and second ports;
   said piston moveable to a second position such that said piston seals the sides of said cylinder sealing all three ports from fluid communication with each other;
   said piston moveable to a third position such that said third port is in fluid communication with said second port such that compressible fluid passes from the air spring through the second port and through the third port and said piston seals the sides of the cylinder sealing said first port from the second and third ports;
   said passage through the piston fluidically connecting the second port with one of the first and third ports when said piston is in one of said respective first and third positions;

the air spring being operably connected to the piston rod and cylinder such that the compressible fluids flowing in and out of said air spring control the position of said piston in said cylinder;

the fluid which flows into the second port when the piston is in its first position moving the piston toward said second position and said fluid which flows out of the second port through the cylinder and through the third port when the piston is in its third position moving the piston towards said second position;

the piston having sealing means mounted on the sidewalls thereof for sealing the ports when the piston is laterally aligned therewith;

said passage through said piston having a first outlet at the top surface of said piston with said outlet in fluid communication with said second port and said second outlet aligned with one of the first and third ports when the piston is one of its first and third positions, respectively, such that said compressible fluid flows through the passage between said second port and one of the first and third ports, the other of the first and third ports being positioned above said piston and in fluid communication with the second port when the piston is in the other of its third and first positions respectively.

2. A pneumatic control valve as defined in claim 1 wherein the said second outlet in said piston is on said side surface of the piston and is laterally aligned with one of the first and third ports when the piston is in its respective first or third positions.

3. A pneumatic control valve for controlling the flow of compressible fluids to a pneumatic spring comprising:

a cylinder with a first, second, and third port therethrough spaced along the side of said cylinder;

said first port located near the bottom of the cylinder and connectable to a supply of compressible fluid;

said second port located near the top of the cylinder and in fluid communication with said pneumatic spring;

said third port located between said first and second ports and open to the atmosphere;

a piston slidably mounted in the cylinder;

a piston rod extending down from the piston and out through the bottom end of the cylinder;

said piston having a passage therethrough with one outlet at the top surface of the piston and a second outlet on the side of the piston;

said piston having a seal about its side surface at its top end, and seals located above and below the second outlet, said seals being in abutting relationship with the side wall of the cylinder;

said piston side wall between the seals above and below the said second outlet being spaced from said side wall of the cylinder such that a clearance for the passage of compressible fluid is formed;

said piston movable to a first position such that the first port is laterally aligned with said clearance and said second port is positioned above said piston with the passage connecting the first port with the second port, said third port being sealed by said seals on the side wall of the piston;

said piston movable to a second position such that said clearance becomes disaligned with said first port and said first and third ports are both sealed by the seals around the side wall of the piston;

said piston movable to a third position such that the third port is above the piston and in fluid communication with the second port, said first port being sealed by the seals of the piston;

the pneumatic spring is operably connected to said control valve such that compressible fluid flowing into said spring when the piston is in its first position moves the piston toward said second position and compressible fluid flowing out of the spring and through the third port when the piston is in its third position moves the piston toward said second position.

4. A fluid control valve for controlling the flow of compressible fluids to and from a work station comprising;

a cylinder with a first, second and third ports therethrough spaced intervally along the cylinder;

said first port operably connectable to a supply of compressible fluid;

said second port operably connectable to a work station;

said third port being in fluid communication with the exterior of said cylinder;

a piston slidably mounted in the cylinder in abutting relationship with the interior of the cylinder;

a piston rod rigidly connected to said piston and extending through one end of said cylinder;

said piston having a passage therethrough;

said piston moveable to a first position such that said first port is in communication with said second port such that compressible fluid passes from said first port through said second port to said work station and said piston seals the side of said cylinder sealing a third port from the said first and second ports;

said piston moveable to a second position such that said piston seals the sides of said cylinder sealing all three ports from fluid communication with each other;

said piston moveable to a third position such that said third port is in fluid communication with said second port such that compressible fluid passes from said work station through the second port and through the third port and said piston seals the sides of the cylinder sealing said first port from the second and third ports;

said passage through said piston fluidically connected said second port with one of the first and third ports when said piston is in one of said respective first and third positions;

the second port and the other of the first and third ports being positioned beyond the end of said piston opposing the piston rod and in fluid communication with each other when the piston is in the other of its first and third positions.

5. A pneumatic control valve as defined in claim 4 wherein:

said work station comprises an air spring operably connected to the piston rod and cylinder such that the compressible fluids flowing in and out of said air spring control the position of said piston and said cylinder;

the fluid flowing into the second port when the piston is in its first position moves the piston towards said second position and said fluid flowing out of the second port through the cylinder and through the third port when the piston is in its third position moves the piston towards the second position.

6. An air control valve as defined in claim 4 wherein:

said piston rod extends through one end of the cylinder;

said second port is in the proximity of the opposing end portion of the cylinder with said first and third ports positioned between it and said end through which the piston rod extends;

said passage through said piston has a first outlet at the end surface of said piston opposing the piston rod with said outlet in fluid communication with said second port and said second outlet aligns with one of the first and third ports when the piston is in one of its first and third positions respectively such that said compressible fluid flow through the passage between said second port and one of the first and third ports.

* * * * *